United States Patent Office 3,657,417
Patented Apr. 18, 1972

3,657,417
THYMUS EXTRACT HAVING A THERAPEUTIC ACTION
Brunetto Brunetti and Emilio Pini, Milan, Italy, assignors to Laboratori farmaco-biologici ELLEM S.p.A., Milan, Italy
No Drawing. Filed May 26, 1969, Ser. No. 827,928
Int. Cl. A61k 17/00
U.S. Cl. 424—95                                    1 Claim

ABSTRACT OF THE DISCLOSURE

Calf thymus extract having an anti-leukopenic action obtained by partially lysing and deproteinizing fragments of the thymus of a recently slaughtered calf, filtered and diluted in a physiological salt solution.

BACKGROUND OF THE INVENTION

The present invention relates to a new biological extract having a determined therapeutic action, to the preparation of the solution for parenteral use of the extract, and to therapeutic methods using said extract.

SUMMARY OF THE INVENTION

Object of the invention is to provide a biological extract having an anti-leukopenic action in general and in particular suitable for use in the therapy of leukopenia and in treatments with myelo-toxic agents and the like.

This and further objects which will appear from the following description are attained by a thymus extract having an anti-leukopenic action, comprising partially lyzed and deproteinized thymus of a young animal of the mammalian class, and diluted in a physiological salt solution.

It has been found that best results are obtained with an extract of calf thymus.

The applicants obtain said extract by partial lysis of the calf thymus and subsequent deproteinization of the extract. The applicants have found that the extract obtained has well defined chemical and biological characteristics.

The extensive medical experimentations have shown that the extract performs an anti-leukopenic action and may be employed in the therapy of primary and secondary leukopenia with treatment with myelo-toxic agents (such as radiant energy, Roentgen therapy, cobalto therapy, beatron, cytostatic chemotherapeutants).

DESCRIPTION OF THE PREFERRED EMBODIMENTS

The thymus extract of the present invention may be obtained by the following method:

20 kg. of thymus of recently slaughtered calf, reduced into fragments of about 2 mm. in diameter were treated at room temperature (about 20° C.) with 1600–2400 g. of hydrochloric acid having a density of 1.092. Thus the thymus-to-hydrochloric acid weight ratio varies from $$\frac{20,000}{2400}=8.3 \text{ to } \frac{20,000}{1600}=12.5$$

The mass was carefully mixed and let at a temperature of 20° C. for 18–24 hours.

After such time the mass was transferred into a thermostatic chamber and the temperature maintained at 45–55° C. for 48–72 hours. Subsequently centrifuging was employed and the liquid separated was placed in a refrigerator at 0° C. for 72 hours. The temperature was then brought to 20° C. and the liquid filtered.

The filtrate was treated, under stirring, with a normal solution of sodium hydroxide until a pH of 4.4–4.8 had been reached and was heated for 60 minutes in a thermo-regulated water bath at 80° C. It was then cooled to 20–25° C. and filtered.

The obtained filtrate was again treated, under stirring, with a normal solution of sodium hydroxide until a pH of 9–9.5 had been reached and then heated for 60 minutes in a thermoregulated water bath at 80° C. It was then cooled at 20–25° and filtered. The pH of the filtrate was then adjusted to 6.5–6.7 with a normal solution of hydrochloric acid.

The extract obtained was subjected to a temperature of −2–0° C. and maintained at such temperature for 72 hours. After such period the temperature of the extract was raised to 20–25° C. and it was filtered.

The extract obtained thus is rapidly frozen to −15° C. and successively centrifuged. In this manner the ice formed is eliminated. The extract is further frozen at −20° C. until it reaches a concentration ratio of 1:80÷1:100 with respect to the initial gland.

The concentrated extract is then diluted with glycerol in order to obtain a thymus extract with a ratio of 1:50 with respect to the gland.

Such 1:50 thymus extract is then diluted 1 to 4 with physiologic salt solution and the solution after filtration in a HAWP 142/50 filter manufactured by the Millipore Filter Corporation of Bedford, Mass., was placed in 2 ml. ampuls which were sterilized in an autoclave at 120° C. for 30 minutes.

The chemical analysis of various samples of 1:50 thymus extract have given the following results expressed in mg./ml.:

|  | Sample | | | | | |
| --- | --- | --- | --- | --- | --- | --- |
|  | 1 | 2 | 3 | 4 | 5 | 9 |
| Dry residue | 26.10 | 24.90 | 25.90 | 26.37 | 23.79 | 21.24 |
| Total nitrogen | 2.29 | 1.67 | 2.16 | 2.11 | 2.01 | 1.71 |
| Inorganic phosphorus | 0.25 | 0.19 | 0.22 | 0.22 | 0.15 | 0.19 |
| Organic phosphorus | 0.30 | 0.21 | 0.30 | 0.33 | 0.20 | 0.20 |
| Total phosphorus | 0.55 | 0.40 | 0.52 | 0.55 | 0.35 | 0.39 |
| Amino acids (expressed as leucine) | 1.68 | 1.64 | 1.68 | 1.96 | 1.84 | 1.74 |
| Adenosine | 2.20 | 2.70 | 2.00 | 3.10 | 2.50 | 2.30 |
| Guanosine | 1.60 | 1.30 | 1.10 | 1.80 | 1.20 | 1.30 |

The anti-leukopenic action of the thymus extract of the present invention has been determined by means of the following pharmacological tests;

(1) In rabbits, panroentgenized and immunized with ciliary typhic antigene and with human erythrocytic antigene, the administration of the thymus extract causes a distinct antibody response and a highly evident leukopoietic response. The data obtained in a series of experiments are indicated in Table II.

(2) In rats, pan-irradiated with X-rays, the thymus extract is able to accelerate the recovery from leukocytary damage induced by the pan-irradiation.

For example a series of experiments was performed on a group of 15 control rats and a group of 15 rats treated with thymus extract (0.5 cc. ampul procapite and pro die), all the rats having been previously pan-irradiated in a single sitting with administration of 250 r. with the following technical data: kv. 180, ma. 15 dip 60 cm. filter 0.25 Cu+1 Al.

The starting leukocytary values (9,600 white corpuscles) was reduced on the 5th day to 5,400 for the control rats, and 6,400 for the treated rats. Subsequently on the 11th day the treated rats had already reached the starting values while the control rats had risen only to 7,600.

On the 18th day the treated rats reached the value of 10,900 against a value of 8,750 for the control rats which, thus, were still below the starting level.

(3) The thymus extract acts by stimulating the phagocitary activity of the reticulcendothelial system.

In a research carried out, 30 albino mice of 25 g. were divided into two groups of 15 animals (1st control group treated with physiological salt solution—2nd group treated with thymus extract). After 20 days of treatment the mice were inoculated with Indian ink (16 mg. per 100 g. of weight).

Two abstractions of 0.020 ml. each time were made one after 4' and one after 25' from the inoculation with Indian ink.

The abstractions were transferred into test tubes containing 3 ml. of 1% sodium carbonates and read on the spectrophotometer at 625 m$\mu$.

The phagocytary index K was then evaluated from the formula:

$$K = \frac{\log C_1 - \log C_2}{T_2 - T_1}$$

where C=concentration of the Indian ink, and T=time in minutes. The values obtained are indicated in the following table:

| Group | No. of mice | Days of treatment | K(×10⁻³) |
|---|---|---|---|
| Control mice | 15 | 20 | 8.59 |
| Treated mice | 15 | 20 | 14.03 | thus demonstrating a clear increase of the phagocytary index in the group of animals treated with thymus extract.

(4) The leukocytotic action of the thymus extract may be again evaluated with a test based on the protection with respect to the myelotoxic activity of the amino-pterin (N-(p(((2,4 - diamine - 6 - pteridyl)-methyl)-amino)-benzyl)-glutamic acid) in the mouse and by calculating the reduction of the mortality index.

For example, for an activity determination, 90 mice were used, of average weight of 30 g., which were divided into two groups of 45 mice. Each group was divided into 3 lots of 15 mice.

The 1st group was constituted of control animals, treated, by intraperitoneal route, with 3-2.5-2 mg./kg. of amino-pterin for the various lots respectively.

The 2nd group was treated with the same doses of amino-pterin as the 1st group, for each lot, and with thymus extract (ampul) in an amount of 1 ml. per mouse, for two days before the inoculation of the amino-pterin and until the end of the experiment (6th day).

After the inoculation of the amino-pterin the dead animals for each lot were counted at the fourth, fifth and sixth day.

The activity (A) of the thymus extract can be calculated with the formula:

$$A = \frac{T_1 + T_2 + T_3}{C_1 + C_2 + C_3} \times 100$$

where $T_1$, $T_2$ and $T_3$ respectively represent the dead animals on the 4th; 4th and 5th; 4th, 5th and 6th day after treatment with amino-pterin and thymus extract and $C_1$, $C_2$ and $C_3$ respectively represent the dead animals on the 4th; 4th and 5th; and 4th, 5th and 6th day after treatment with only amino-pterin.

The activity index (A) for the above determination was 55.5, thus demonstrating was high activity of the extract.

The clinical activity of the thymus extract in the therapy of primary and secondary leucopenia was repeatedly noted by using the ampuls prepared as described previously.

For example, a clinical experiment was carried out on 40 patients, where the leukocytary values were considerably lowered following radiant therapy (deep X-ray therapy from 200 kv., telecobalto-therapy, photons and electrons emitted by Siemens betatron 42 mev.). The administration of thymus extract was particularly efficacious.

The action of the drug is not influenced to the type of radiation employed. In 90% of patients treated generally satisfactory results were obtained. In fact, administering the thymus extract in an amount of two ampuls per day, it was possible to finish the radio-therapy without interruption, despite the initial noted tendency to the leukopenia.

Consequently the thymus extract shown to be a good therapeutic means able to resolve, in almost all cases leukopenia due to irradiation, which are othewise difficult to dominate. The absolute non-toxicity of the drug was also ascertained.

Another example of the activity of the thymus extract was had in another group of 40 patients affected by:

(1) primitive leukopenia.
(2) secondary leukopenia treated with myelo-toxics (cytostatics and radiant therapies.
(3) immuno-allergic leukopenia from aminopyrine.

The results achieved lead to the conclusion that the thymus extract, administered in the dose of two ampuls per day develops an efficient anti-leupenic action without the occurence of local or general collateral facts.

A third clinical experiment was carried out on a group of 22 patients affected by secondary leukopenia with myelo-toxic treatments (radiant therapies and with cytostatics) and treated with thymus extract in the dose of 2 ampuls per day. Positive results were obtained in almost all cases. In fact the treatment with thymus extract in time prevents, in patients subjected to myelo-toxic therapies, the beginning of leukopenia which, however, occured in all the patients of a group (10 patients) under cytostatic therapy but not protected by thymus extract.

The comparison of the results obtained with the patients treated with thymus extract and a group of 29 patients treated with traditional anti-leukopenic therapies (hepatic extracts), vitamin B12 also in coenzymic form, vitamin B6, folic acid, high doses of testosterone, etc.) showed a very considerably higher activity of the thymus extract.

In fact, while in the group of patients treated with the traditional therapies an average 50% reduction of the white corpuscles took place, in the patients treated with thymus extract (ampul) in similar conditions a reduction of only 16% took place.

TABLE II

| | X-ray irradiation and successive immunization with thyphic anti-genes-cyliary, averages | | | | | | | |
|---|---|---|---|---|---|---|---|---|
| | Before irradiation | | Before immunization | | After immunization | | Variation, percent | |
| | Checks | Treated with thymus extract | Checks | Treated with thymus extract | Checks | Treated with thymus extract | Checks | Treated with thymus extract |
| Gamma-globuline | 1.04 | 1.03 | 0.91 | 0.86 | 1.05 | 1.26 | +15 | +46 |
| Leucocytes/mmc | 6,940 | 6,980 | 3,660 | 3,880 | 4,920 | 8,380 | +34 | +116 |
| Neutrophils | 48 | 49 | 57 | 56 | 53 | 41 | −5 | −27 |
| Lymphocytes | 47 | 47 | 37 | 39 | 42 | 56 | +14 | +44 |
| Antibody titer | | | | | 1:4608 | 1:22524 | | |
| | X-ray irradiation and immunization with human erythrocytes, averages | | | | | | | |
| Gamma-globuline | 1.05 | 1.04 | 0.83 | 0.84 | 0.97 | 1.10 | +17 | +31 |
| Leucocytes/mmc | 7,120 | 6,960 | 4,240 | 3,560 | 5,340 | 8,140 | +28 | +128 |
| Neutrophils | 49 | 51 | 58 | 58 | 50 | 37 | +14 | −3 |
| Lymphocytes | 46 | 46 | 35 | 36 | 45 | 57 | +29 | +58 |
| Antibody titer | | | | | 1:26 | 1:409 | | |

What is claimed is:

1. A therapeutic thymus extract dilution as obtained by the process which comprises:

chopping a starting quantity of a thymus gland of a calf of a mammal, mixing the chopped starting quantity of the thymus at 20° C. with hydrochloric acid having a density of 1.092, the chopped starting quantity of thymus-to-hydrochloric acid weight ratio ranging between 8.3 to 312.5 and leaving the obtained hydrochloric acid-chopped starting quantity of thymus mixture to rest for from 18 to 24 hours at a temperature of 20° C., heating said mixture to 45–55° C. and maintaining said mixture at 45–55° C. for 48–72 hours, separating the liquid from said mixture, by centrifuging, cooling the separated liquid to 0° C. and maintaining said separated liquid at about 0° C. for about 72 hours, heating the said liquid to 20° C. and filtering the liquid to obtain a first filtrate, treating the said first filtrate with a normal solution of sodium hydroxide by adding said normal solution under stirring until a pH of 4.4–4.8 has been reached, heating the sodium hydroxide treated first filtrate to 80° C. and maintaining it at 80° C. for 1 hour, cooling the said sodium hydroxide treated first filtrate to 20–25° C. and filtering to obtain a second filtrate, treating said second filtrate with a normal solution of sodium hydroxide by adding said normal solution under stirring until a pH of 9–9.5 has been reached, heating the sodium hydroxide treated second filtrate to 80° C. and maintaining it at 80° C. for 1 hour, cooling the sodium hydroxide treated second filtrate to 20–25° C. and filtering to obtain a third filtrate;

adjusting the pH of said third filtrate to 6.5–6.7 with a normal solution of hydrochloric acid and cooling the adjusted third filtrate to −2° C.–0° C. and maintaining it at −2° C.–0° C. for 72 hours, heating then said adjusted third filtrate to 20–25° C. and filtering to obtain a fourth filtrate.

cooling said fourth filtrate to −15° C. to freeze said fourth filtrate and obtain ice formations therein, centrifuging the frozen fourth filtrate to remove ice formations therefrom thereby obtaining an intermediate extract;

freezing again at −20° C. said intermediate extract to obtain a concentrated extract therefrom in a quantity such that the starting quantity of thymus gland-to-concentrated extract weight ratio is in the range from 80:1 to 100:1, and diluting the concentrated extract with glycerol in such quantity to obain a thymus extract with a ratio of 1:50 with respect to the gland.

References Cited

Chemical Abstracts 51:2179 i (1957).

ALBERT T. MYERS, Primary Examiner

F. E. WADDELL, Assistant Examiner